June 3, 1941.   R. J. GUBA   2,244,422
WOVEN WIRE BELTING
Filed Nov. 19, 1938   2 Sheets-Sheet 1

WITNESS
F. J. Hartman

INVENTOR
Raymond J. Guba.
BY John D. Myers
ATTORNEY

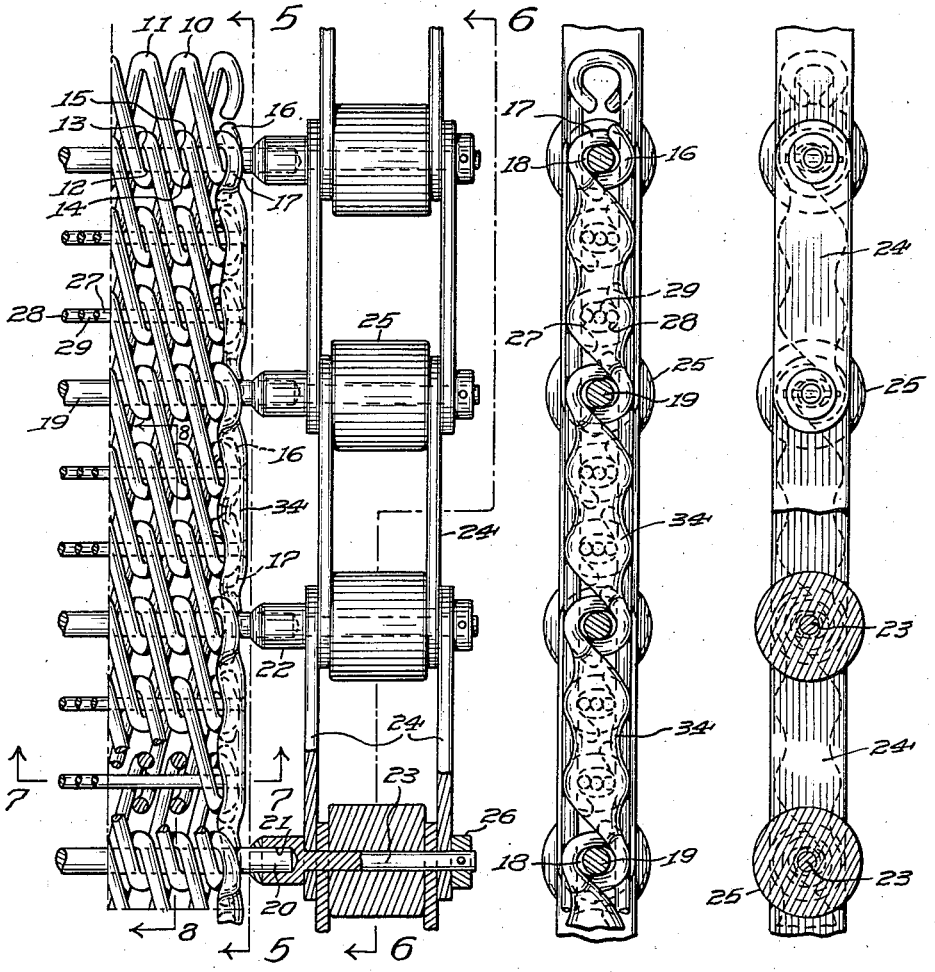

Patented June 3, 1941

2,244,422

UNITED STATES PATENT OFFICE 2,244,422

WOVEN WIRE BELTING

Raymond J. Guba, Philadelphia, Pa., assignor to Audubon Wire Cloth Corporation, a corporation of New Jersey Application November 19, 1938, Serial No. 241,482

5 Claims. (Cl. 198—194)

The invention relates to woven wire belting and involves an improvement in means for hinging adjacent sections of such a belt together and maintaining the operating surface of the belt in the same plane.

One of the principal objects of the invention is the provision, in a woven wire belt, of a structure which is sufficiently flexible to enable the belt to pass around the usual driving and supporting rolls which are employed therewith, and which is, at the same time, sufficiently rigid to prevent the operating surface from sagging or being otherwise displaced from a plane in which it is desired to transport articles carried thereon.

Another object of the invention is the provision of improved means for supporting a woven wire belt in such manner as to prevent undue stretching of the belt lengthwise thereof.

A still further object of the invention is the provision of means for preventing lateral movement of the fabric of an interwoven wire belt in either direction lengthwise of the cross rods employed therewith.

Other objects and advantages of the invention will be apparent from the following description, taken with the accompanying drawings wherein:

Fig. 4 is a plan view, partly in section, showing a portion of one edge of a belt having a modified form of my improvement incorporated therein;

Fig. 5 is a longitudinal sectional view taken on the line 5—5 of Fig. 4;

Fig. 6 is a side elevational view, partly in section, substantially on the line 6—6 of Fig. 4;

Fig. 7 is a detail sectional view taken substantially on the line 7—7 of Fig. 4; and Fig. 8 is a longitudinal sectional view taken on the line 8—8 of Fig. 4.

Figure 1:
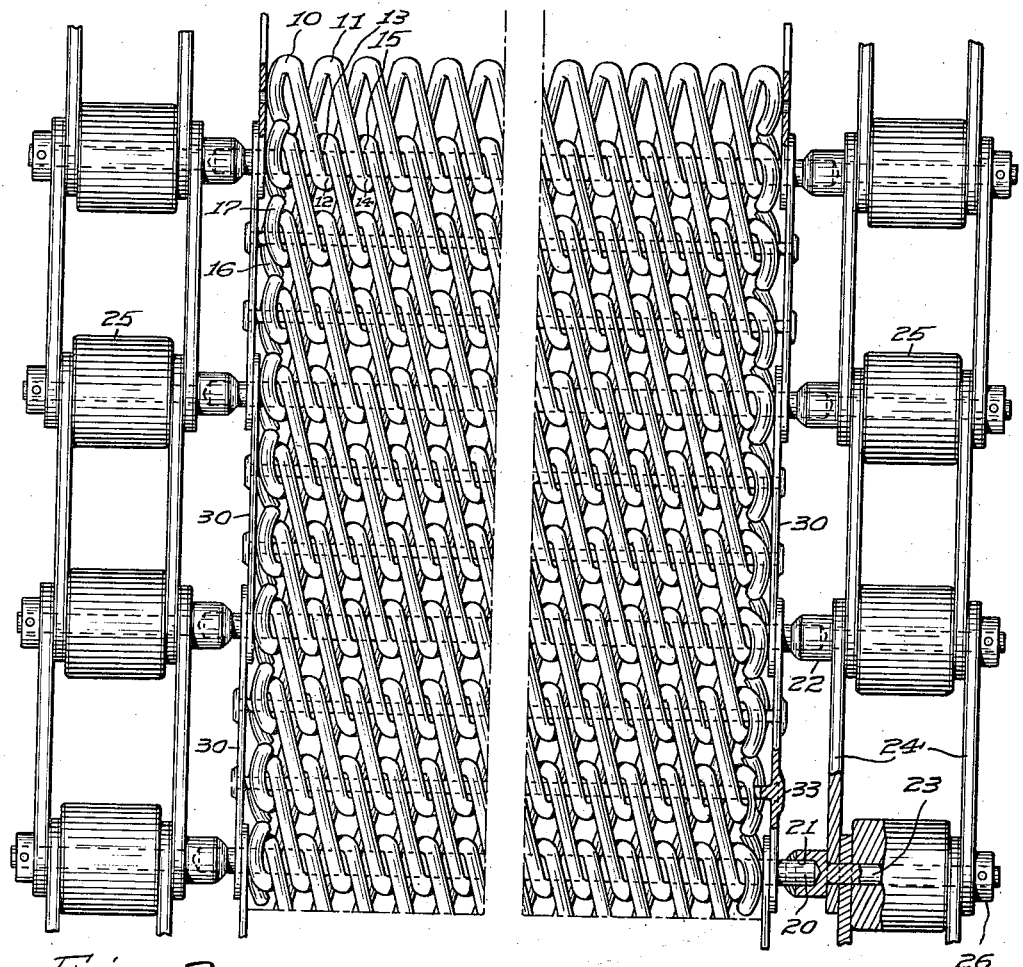
Fig. 1 is a plan view, partly in section, showing a portion of a woven wire belt with one form of the improvement embodied therein.

While the present improvements may be utilized with other forms of woven wire fabric and belting made therefrom, I have illustrated the same in the drawings in connection with a fabric in which the helical coils are of a composite character in that each coil unit comprises two independent coils 10 and 11 of similar structure and threaded together in such a manner as to be confined within the same marginal limits. A plurality of such coil units are successively interwoven with each other to form a continuous length in a manner well understood in the art.

As will be apparent from the drawings, the loop portions 12 of the turns of the coil 10 overlap and interengage with loop portions 13 of the turns of coil 11 in the adjacent coil unit. It will also be apparent that loop portions 14 of the turns of coil 11 overlap and interengage with loop portions 15 of the turns of coil 10 in the adjacent coil unit. In the structure which I prefer to use, adjacent pairs of interengaging coils 10 and 11 terminate in hooked end portions 16 and 17 along both edges of the fabric.

The loop portions of adjacent coil units overlap to such an extent as to provide openings 18 extending transversely of the fabric for receiving cross rods designed to support the operating surface of the belt in a desired plane. As is well understood in the art, the tension which is exerted upon the loop portions of one of the coil units by an endwise pull upon a belt of this character is transmitted through the cross rods, and not directly, to the interengaging loop portions of the adjacent coil units.

In the two forms of the invention as disclosed herein, certain of the cross rods arranged at regular intervals throughout the length of the belt, such as those designated 19, serve as hinge rods. As the invention is illustrated in the drawings, a hinge rod 19 is utilized in every third joint between composite coil units. It will be understood, however, that hinge rods 19 may be arranged at any suitable interval so long as those portions of the belt between successive hinge rods are properly supported to retain the operating surface of the belt within a plane.

In both forms of the invention as it is illustrated in the drawings, the ends of the hinge rods 19 project outwardly beyond the edges of the fabric as shown at 20, and these projecting ends are welded or otherwise secured in openings 21 in enlarged heads 22 on pintles 23. The pintles 23 serve to connect the overlapping ends of links 24 with rollers 25 to form a drive chain of well-known construction along each edge of the belt. The links 24 and rollers 25 are held against endwise movement upon the pintles 23 by the heads 22 and by collars 26 pinned on the outer ends of the pintles. As is well understood in the art, the rollers 25 of the drive chains are designed to run upon suitable tracks or guideways and thus serve to support the operating run of the belt in a desired position.

While a single cross rod comparable in diameter to a hinge rod 19 may be utilized at each of the joints of adjacent coil units between the hinge rods, I have found that it is entirely satisfactory and more economical to employ a plurality of relatively small rods at each non-hinging joint. As disclosed herein, each non-hinging cross rod comprises three small rods, an upper one 27, a lower one 28, and an intermediate one 29. The size and number of these small rods should be such as to maintain the outer edges of the coil units in the plane of the operating surface of the belt.

Figure 2:
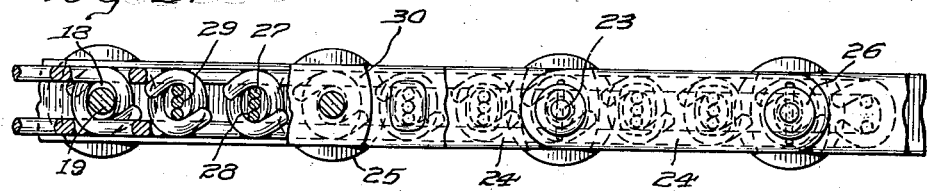
Fig. 2 is a side elevational view, partly in section, of the belt structure shown in Fig. 1.
Figure 3:
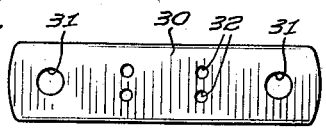
Fig. 3 is a side elevational view of one of the supporting links utilized with the form of the improvement shown in Fig. 1.

In the form of my improvement illustrated in Figs. 1, 2 and 3 of the drawings, those portions of the fabric between successive hinge rods 19 are restrained from sagging or otherwise moving out of the plane of successive hinge rods by means of supporting links 30 arranged along each edge of the fabric with the ends in overlapping relation as shown in Fig. 1. The ends of each of the links 30 are provided with openings 31 to receive the projecting ends 20 of the hinge rods, so that the links are freely supported for hinging movement upon hinge rods 19. Intermediate the end openings 31 the links are provided with two pairs of smaller openings 32 for the purpose of receiving the ends of the upper and lower cross rods 27, 28, which are of such a length as to project outwardly beyond the edges of the fabric. The ends of the cross rods 27, 28 are preferably welded in the openings 32, as shown at 33. I have found that the intermediate cross rod 29 at each joint may be loosely confined between the upper and lower cross rods 27 and 28, and that it is unnecessary to secure its ends to links 30.

It will be apparent that the structure just described is one in which the belt is formed of a series of rigid sections which extend from a hinge rod to the next succeeding hinge rod and are connected to each other by the hinge rods; that those portions of the fabric which lie between successive hinge rods 19 are supported by means of the side links 30 and the non-hinging cross rods 27, 28 and 29; that the construction retains the operating surface of the belt within the same plane; that by reason of the hinging feature which is provided, the belt is sufficiently flexible to pass readily around the usual supporting rolls or drums; that lateral movement of the fabric is prevented by the engagement of the end portions 16, 17 with links 30, and by the engagement of links 30 with heads 22; and that the tendency of the fabric to elongate lengthwise of the belt is prevented by the side supporting construction.

In the form of the improvement illustrated in Figs. 4 to 8 of the drawings, no side supporting links, such as the links 30 shown in Figs. 1 to 3, are employed. Instead of the side links I have found that those portions of the fabric between successive hinge rods 19 may be supported in the plane of the hinge rods by welding together the ends 16, 17 which are positioned between successive hinge rods. As shown in Figs. 4 and 5 of the drawings, such a weld includes the ends of six coils and provides what is substantially a rigid supporting element 34 in which the six ends of the coils and the six ends of the small cross rods 27, 28, 29 are secured. In this form of the invention, the ends of the coils are thus secured in and form a part of the edge supporting means.

As with the form of the invention shown in Figs. 1 to 3, the welded edge structure illustrated in Figs. 4 to 8 likewise provides a belt formed of rigid sections hinged together in such a manner by the hinge rods 19 that the portions of the belt between successive hinge rods are so supported that the operating surface of the belt is kept within the same plane, although the belt is sufficiently flexible to permit it to pass around the usual supporting rolls. This feature of the improvement is particularly advantageous in various manufacturing processes where it is desired to transport articles so that they are retained in substantially the same plane.

While certain forms of my improvement, together with the preferred arrangement of the parts thereof, are disclosed herein, it is to be understood that the invention is not intended to be limited to the precise structure and arrangement of parts as shown and described. The disclosure is therefore to be regarded as illustrative only, and it is to be understood that the invention is susceptible of embodiment in other forms and arrangements so long as they are within the scope of the claims hereby made.

What is claimed is:

1. A woven wire belt comprising a plurality of rigid sections hingedly connected to each other by a hinge rod to form a continuous fabric, each section including a plurality of interwoven helical coils having the turns of each overlapping and interlocking with the turns of adjacent coils, a cross rod extending through each of said coils between the turns thereof and the overlapping turns of each adjacent coil, and means hinged on said hinge rod and rigidly connecting the ends of each cross rod to the adjacent ends of the other cross rods in the section to maintain said coils in the same plane.

2. In a woven wire belt comprising a plurality of interwoven helical coils having the turns of each overlapping and interlocking with the turns of adjacent coils to form a continuous fabric of hinged sections, a hinge rod extending freely through the end coil of each section between the turns thereof and the overlapping turns of the end coils of adjacent sections, cross rods extending through the overlapping turns between said hinge rods, and rigid means having the ends of said cross rods secured thereto and its opposite ends hinged upon successive hinge rods.

3. A woven wire belt comprising a plurality of composite helical coils having the turns of each overlapping and interlocking with the turns of adjacent coils to form a continuous woven fabric, a cross rod extending through each of said composite coils within the overlapping portions of the turns of adjacent coils, non-successive cross rods extending freely through the coils to provide hinge rods uniformly spaced from each other, and supporting links having their opposite ends hinged upon successive hinge rods on the opposite edges of the belt, the ends of the cross rods intermediate said hinge rods being secured to said links to provide rigid belt sections hinged to each other.

4. A woven wire belt section comprising a plurality of interwoven helical coils having the turns of each overlapping and interlocking with the turns of adjacent coils to form a continuous fabric, a hinge rod extendingly freely through the coils on the opposite ends of the section to flexibly connect said section to adjacent sections, a supporting link on each edge of said section and having its ends hinged upon said hinge rods, a cross rod extending through each coil between turns thereof and the overlapping turns of each adjacent coil, and means for securing the ends of said cross rods to said supporting links.

5. A woven wire belt section comprising a plurality of interwoven helical coils having the turns of each overlapping and interlocking with the turns of adjacent coils to form a continuous fabric, a hinge rod extending freely through the coils on the opposite ends of the section to flexibly connect said section to adjacent sections, a supporting link on each edge of said section and having its ends hinged upon said hinge rods, a plurality of cross rods extending freely through each coil between the turns thereof and the overlapping turns of each adjacent coil, and means for securing the ends of said hinge rods to said supporting links.

RAYMOND J. GUBA.